(12) United States Patent
Christophe (10) Patent No.: US 9,852,374 B2
(45) Date of Patent: Dec. 26, 2017

(54) ONTOLOGICAL CONCEPT EXPANSION FOR IMPROVED SIMILARITY MEASURES FOR DESCRIPTION LOGIC

(71) Applicant: Alcatel Lucent, Boulogne Billancourt (FR)

(72) Inventor: Benoit Christophe, Massy (FR)

(73) Assignee: Alcatel Lucent, Boulogne-Billancourt (FR)

( * ) Notice: Subject to any disclaimer, the term of this patent is extended or adjusted under 35 U.S.C. 154(b) by 759 days.

(21) Appl. No.: 14/315,364

(22) Filed: Jun. 26, 2014

(65) Prior Publication Data
US 2015/0227834 A1  Aug. 13, 2015

Related U.S. Application Data

(60) Provisional application No. 61/938,714, filed on Feb. 12, 2014.

(51) Int. Cl.
*G06N 5/02* (2006.01)
(52) U.S. Cl.
CPC .................................. *G06N 5/022* (2013.01)
(58) Field of Classification Search
None
See application file for complete search history.

(56) References Cited

U.S. PATENT DOCUMENTS

| 6,487,545 | B1* | 11/2002 | Wical | G06F 17/271 |
| | | | | 706/45 |
| 8,856,181 | B2* | 10/2014 | Dias | G06F 17/30675 |
| | | | | 707/749 |
| 2013/0166561 | A1* | 6/2013 | Georgescu | G06F 17/30746 |
| | | | | 707/739 |

OTHER PUBLICATIONS

Flahive et al. Ontology expansion: appending with extracted sub-ontology. vol. 19 No. 5, 2010. Published by Oxford University Press.*
Pan, Jeff. Description Logics: Reasoning Support for the Semantic Web. The University of Manchester. 2004.*
Flouris et al. Handling Ontology Change: Survey and Proposal for a Future Research Direction. TR-362, FORTH-ICS, Sep. 2005.*
Wong et al. Incorporating Concept Ontology into Multi-level Image Indexing. ICIMCS'09, Nov. 23-25, 2009.*
Yan, Xiaodong. Research on automatically building Tibetan folk culture ontology library for Sino-Tibetan Machine translation. 2013 6th International Conference on Intelligent Networks and Intelligent Systems.*

(Continued)

*Primary Examiner* — Stanley K Hill
*Assistant Examiner* — Robert Bejcek, II
(74) *Attorney, Agent, or Firm* — Mendelsohn Dunleavy, P.C.; Steve Mendelsohn (57) ABSTRACT

In one embodiment, prior to similarity measure computation, concept expansion is applied to an original ontology to generate an expanded ontology having the original concepts plus one or more pseudo-concepts, wherein at least one original concept is defined using a hierarchy of (possibly transitive) properties. As a result, the similarity measure computation can produce results that are better than those produced using conventional techniques. In one implementation, the similarity measure computation involves combining two similarity results: a first similarity result corresponding to common semantics found in the two concepts and a second similarity result corresponding to dissimilar semantics found in the two concepts.

19 Claims, 9 Drawing Sheets

(56) References Cited

OTHER PUBLICATIONS

Giugno et al. P-SHOQ(D): A Probabilistic Extension of SHOQ(D) for Probabilistic Ontologies in the SemanticWeb. S. Flesca et al. (Eds.): JELIA 2002, LNAI 2424, pp. 86-97, 2002.*
Wang et al. A Concept Hierarchy Based Ontology Mapping Approach. Y. Bi and M.-A. Williams (Eds.): KSEM 2010, LNAI 6291, pp. 101-113, 2010.*
OWL Web Ontology Language Reference. Available at http://www.w3.org/TR/owl-ref/ Nov. 12, 2009.*
Ian Horrocks et al., "Ontology Reasoning in the SHOQ(D) Description Logic," IJCAI'01 Proceedings of the 17th international joint conference on Artificial intelligence—vol. 1, pp. 199-204.

* cited by examiner

FIG. 1

TABLE 1: SYNTAX AND SEMANTICS OF $\mathcal{SHOQ}$

| DESCRIPTION | SYNTAX | SEMANTICS |
|---|---|---|
| ATOMIC CONCEPT | $A$ | $A^\mathcal{I} \subseteq \Delta^\mathcal{I}$ |
| ATOMIC ROLE | $R$ | $R^\mathcal{I} \subseteq \Delta^\mathcal{I} \times \Delta^\mathcal{I}$ |
| NEGATION | $\neg C$ | $\Delta^\mathcal{I} \setminus C^\mathcal{I}$ |
| CONJUNCTION | $C \sqcap D$ | $C^\mathcal{I} \cap D^\mathcal{I}$ |
| DISJUNCTION | $C \sqcup D$ | $C^\mathcal{I} \cup D^\mathcal{I}$ |
| NOMINAL | $\{a_1, \ldots, a_n\}$ | $\{a_1^\mathcal{I}, \ldots, a_n^\mathcal{I}\}$ |
| QUALIFIED VALUE RESTRICTION | $\forall R.C$ | $\{x \in \Delta^\mathcal{I} \mid \forall y.(x,y) \in R^\mathcal{I} \rightarrow y \in C^\mathcal{I}\}$ |
| FULL EXISTENTIAL QUALIFICATION | $\exists R.C$ | $\{x \in \Delta^\mathcal{I} \mid \exists y.(x,y) \in R^\mathcal{I} \wedge y \in C^\mathcal{I}\}$ |
| QUALIFIED CARDINAL RESTRICTIONS | $\geq nR.C$ | $\{x \in \Delta^\mathcal{I} \mid \#\{y \mid (x,y) \in R^\mathcal{I} \wedge y \in C^\mathcal{I}\} \geq n\}$ |
|  | $\leq nR.C$ | $\{x \in \Delta^\mathcal{I} \mid \#\{y \mid (x,y) \in R^\mathcal{I} \wedge y \in C^\mathcal{I}\} \leq n\}$ |
|  | $= nR.C$ | $\{x \in \Delta^\mathcal{I} \mid \#\{y \mid (x,y) \in R^\mathcal{I} \wedge y \in C^\mathcal{I}\} = n\}$ |
| ROLE HIERARCHY | $R \sqsubseteq S$ | $R^\mathcal{I} \subseteq S^\mathcal{I}$ |
| TRANSITIVE ROLES | $R \in N_{R^+}$ | $\{(x,z) \mid (x,y) \in R^\mathcal{I} \wedge (y,z) \in R^\mathcal{I}\}$ |

| Algorithm Generate the pseudo-concepts subsumed by a concept $C$ in $\mathcal{O}$ |
|---| procedure SUBSUMEES($C, M$):
   $\mathcal{PS} \leftarrow \underline{\Phi_1}(C, M) \cup \underline{\Phi_2}(C, M)$
end procedure procedure $\Phi_1(C, M)$
   for all $\overline{D} \in \mathcal{G}_\mathcal{O}$ and $D \sqsubset C$ do
     $\mathcal{PS} \leftarrow D$
     for all $X \in$ SUBSUMEES($D, M$) do
       $\mathcal{PS} \leftarrow X$
     end for
   end for
end procedure procedure $\Phi_2(C, M)$
   if $(C \equiv \forall R.D)$ or $(C \equiv \exists R.D)$ or $(C \equiv \geq nR.D)$ or $(C \equiv \leq nR.D)$ then
     $S^+ \leftarrow \{S \in N_R \: / \: R \sqsubseteq S\}$
     $S^- \leftarrow \{S \in N_R \: / \: S \sqsubseteq R\}$
   end if
   if $(C \equiv \forall R.D$ and $C \notin M)$ then
     for all $S \in S^+$ do
       if $(R \sqsubset S)$ then
         $\mathcal{PS} \leftarrow \forall S.D$
       end if
       for all $X \in$ SUBSUMEES($D, M \sqcup \{C\}$) do
         $\mathcal{PS} \leftarrow \forall S.X$
       end for
     end for
   else if $(C \equiv \exists R.D$ and $C \notin M)$ then

```
        for all S ∈ S⁻ do
          if (S ⊑ R) then
            PS ← ∃S.D
          end if
          for all X ∈ SUBSUMEES(D, M ⊔ C) do
            PS ← ∃S.X
          end for
        end for
      else if (C ≡≥ nR.D) then
        for all S ∈ S⁻ do
          if (S ⊑ R) then
            PS ← ≥ nS.D
          end if
          for all X ∈ SUBSUMEES(D, M ⊔ C) do
            PS ← ≥ nS.X
          end for
        end for
      else if (C ≡≤ nR.D) then
        for all S ∈ S⁺ do
          if (R ⊑ S) then
            PS ← ≤ nS.D}
          end if
          for all X ∈ SUBSUMERS(D, M ⊔ C) do
            PS ← ≤ nS.X
          end for
        end for
      else if C ≡ ⋃ᴺᵢ₌₁ Cᵢ and C ∉ M then
        for k = 1 ... N do
          PS ← ⋃ᵏₗ₌₁ C_{jₗ} such that 1 ≤ j₁ < jₗ < jₖ ≤ N
        end for
      end if
    end procedure
```

| Algorithm Generate the pseudo-concepts that subsume a concept $C$ in $\mathcal{O}$ |
|---| procedure SUBSUMERS($C, M$):
    $\mathcal{PS} \leftarrow \overline{\Phi_1}(C, M) \cup \overline{\Phi_2}(C, M)$
end procedure procedure $\overline{\Phi_1}(C, M)$
    for all $D \in \mathcal{G}_\mathcal{O}$ and $C \sqsubset D$ do
        $\mathcal{PS} \leftarrow D$
        for all $X \in$ SUBSUMERS$(D, M)$ do
            $\mathcal{PS} \leftarrow X$
        end for
    end for
end procedure procedure $\overline{\Phi_2}(C, M)$
    if $(C \equiv \forall R.D)$ or $(C \equiv \exists R.D)$ or $(C \equiv \geq nR.D)$ or $(C \equiv \leq nR.D)$ then
        $S^+ \leftarrow \{S \in N_R \: / \: R \sqsubseteq S\}$
        $S^- \leftarrow \{S \in N_R \: / \: S \sqsubseteq R\}$
    end if
    if $(C \equiv \forall R.D$ and $C \not\in M)$ then
        for all $S \in S^-$ do
            if $(S \sqsubset R)$ then
                $\mathcal{PS} \leftarrow \forall S.D$
            end if
            for all $X \in$ SUBSUMERS$(D, M \sqcup \{C\})$ do
                $\mathcal{PS} \leftarrow \forall S.X$
            end for
        end for
    else if $(C \equiv \exists R.D$ and $C \not\in M)$ then
        for all $S \in S^+$ do
            if $(R \sqsubset S)$ then
                $\mathcal{PS} \leftarrow \exists S.D$
            end if
            for all $X \in$ SUBSUMERS$(D, M \sqcup C)$ do
                $\mathcal{PS} \leftarrow \exists S.X$
            end for
        end for

```
if (R ∈ N_{R^+} and D ≡ {ε_1 ... ε_m}) then
    if (X ≡ {η_1 ... η_n} and ∀ε_i ∈ D, ∃η_j ∈ X such
that ∃R.{ε_i} ⊑ ∃R.{η_j} and ∀η_j ∈ X, ∃ε_i ∈ D such that
∃R.{ε_i} ⊑ ∃R.{η_j}) then
        PS ← ∃R.X
    end if
end if
else if (C ≡≥ nR.D) then
    for all S ∈ S^+ do
        if (R ⊑ S) then
            PS ←≥ nS.D
        end if
        for all X ∈ SUBSUMERS(D, M ⊔ C) do
            PS ←≥ nS.X
        end for
    end for
else if (C ≡≤ nR.D) then
    for all S ∈ S^- do
        if (S ⊑ R) then
            PS ←≤ nS.D}
        end if
        for all X ∈ SUBSUMEES(D, M ⊔ C) do
            PS ←≤ nS.X
        end for
    end for
else if C ≡ ∩_{i=1}^{N} C_i and C ∉ M then
    for k = 1 ... N do
        PS ← ∩_{l=1}^{k} C_{j_l} such that 1 ≤ j_1 < j_l < j_k ≤ N
    end for
end if
end procedure
```

ONTOLOGICAL CONCEPT EXPANSION FOR IMPROVED SIMILARITY MEASURES FOR DESCRIPTION LOGIC

CROSS-REFERENCE TO RELATED APPLICATIONS

This application claims the benefit of the filing date of U.S. provisional application No. 61/938,714, filed on Feb. 12, 2014, the teachings of which are incorporated herein by reference in their entirety.

The subject matter of this application is related to the subject matter of Ser. No. 13/869,364, filed on Apr. 24, 2013, the teachings of which are incorporated herein by reference in their entirety.

BACKGROUND

Field of the Invention

The present invention relates to computer network-based structured data and, more specifically but not exclusively, to semantic similarity measures for structured data.

Description of the Related Art

This section introduces aspects that may help facilitate a better understanding of the invention. Accordingly, the statements of this section are to be read in this light and are not to be understood as admissions about what is prior art or what is not prior art.

Data on a computer-based network, such as the World Wide Web, can be linked using structured meta-data. In general, structured data enables many applications to be developed and to interact using machine-readable and machine-understandable vocabularies. For instance, in the case of network management, structured data of different equipment can be compared to detect failure and to propose recovery solutions. In a banking context, so-called "structured big data" can represent banking transactions and user profiles that an analysis can turn into assets such as proposing targeted products or advertisements to customers.

In the context of data structured using Semantic Web principles, data is annotated by concepts and properties having been formally defined in an ontology, i.e., defined using logical constructors of a given description logic. The comparison of such semantically enriched structures is usually done by applying one or more similarity measures that attempt to characterize how different structures are similar or how they relate to each other. A plethora of similarity measures applied to ontological data have been designed that rely on different points of view to interpret data descriptions (e.g., based on the main concept that they embody, taking into account all their features, etc.).

The problem with existing similarity measures is that the methodology used to compute similarities may easily lead to poor results when complex semantic descriptions are based on highly expressive description logics. In particular, either the similarity measures ignore most of the semantics (i.e., the logical constructs used to represent concepts and properties mapped on data) or they take such semantics into account too strongly, leading to weak similarity measurements for two concepts that would be considered close from a human point of view.

SUMMARY

U.S. patent application Ser. No. 13/869,364 ("the '364 application"), filed Apr. 24, 2013, the teachings of which are incorporated herein by reference in their entirety, describes a similarity-measurement process that takes into account all or most of the semantics of an expressive description logic, but without taking a too-strong approach when comparing formally defined concepts. According to this process, a concept-expansion mechanism is applied to an original ontology to generate an expanded ontology having the original ontological concepts and one or more pseudo-concepts.

This disclosure describes the design and implementation of a similarity-measurement process that improves upon the technique described in the '364 application by applying the concept-expansion mechanism to ontologies, like SHOQ ontologies, having concepts defined using a hierarchy of (possibly transitive) properties.

BRIEF DESCRIPTION OF THE DRAWINGS

Other embodiments of the invention will become more fully apparent from the following detailed description, the appended claims, and the accompanying drawings in which similar or identical reference numerals identify similar or identical elements.

DETAILED DESCRIPTION

This disclosure relates to a technique for accurately computing the semantic similarity between different concepts having been defined in an ontology underlied by the SHOQ description logic. The SHOQ description logic is described by Ian Horrocks and Ulrike Sattler in "Ontology Reasoning in the SHOQ(D) Description Logic," *Proc. of IJCAI* 2001, pp. 199-204, Morgan Kaufmann, 2001, the teachings of which are incorporated herein by reference in their entirety.

Determining the semantic similarity or relatedness of different data (or services) is an important concept in information systems. Usually based on topological or statistical analysis, it is, for instance, used in information retrieval to expand a query with similar terms or to return ranked results. In information fusion, it is used to reduce uncertainty when merging data from different sources, allowing, for instance, the creation of an ontology using a bottom-up approach. Finally, in data or service maintenance, it allows failure recovery by analyzing which data (resp. service) can be replaced by others. This disclosure addresses the problem of comparing raw data having been associated to concepts or properties defined in ontologies underlied by the expressive DL SHOQ. Usually, these ontologies contain the definitions of a domain of expertise (e.g. automotive, biology, wine, etc.) and may embed few instances of concepts mostly to set up the definition of other concepts (so-called nominals).

Generally, designing a semantic similarity assessment process able to compare different ontological concepts consists of defining a measure whose objective is to quantify the common (and, in some cases, the different distinguishing) features among each pair of compared concepts. Up to now, a plethora of such measures have been designed and applied on elements of an ontology, referring to different point of views that one can have about how elements should be compared. Initially, most of the existing methods were based on an adaptation of measures defined for different and less expressive representations (e.g., feature vectors or trees). However, such measures are unable to convey the underlying semantics of most ontological representations. Later on, other measures coping with more expressive ontologies were developed. However, none of those measures truly address ontologies underlied by a DL allowing the use of additional operators other than the ones defined in the ALCHN (Attributive Concept Language with Complements with hierarchy and cardinal restrictions that are not qualified) DL (e.g., use of transitive properties, nominals, and qualified cardinal restrictions). Finally, most of the recent approaches have considered using the extensions of concepts to compute semantic similarity measurements. This assumption, however, is problematic when considered ontologies solely define the concepts of a domain (and consequently do not intend to embed instances). Moreover, these methods tend to place any defined concept under the ClosedWorld Assumption (as in these approaches, the concept is assimilated as equal to using an annotation mechanism such as Semantic Annotations for Web Resources (SA-REST). In some cases, an ontology represents an entire domain of interest, i.e., its concepts and instances (e.g. in an automotive context). In some other cases, it may focus on representing the concepts and include very few (even none) instances (e.g., the OWL-S ontology) its set of instances, which, by definition, is a wrong assumption when representing concepts in OWL (the Web Ontology Language).

To the best of the inventor's knowledge, no works have been done in the specific case of ontologies underlied by the expressive DL SHOQ, where roles can be transitive and organized in a hierarchy and where concepts can be defined with instances (nominals). Especially, no works were done in the context of ontologies primarily focused on representing concepts more than their instances. This disclosure presents a novel semantic similarity measure for such ontologies. The method relies on an algorithm that expands the classification graph of any ontology underlied by a DL up to SHOQ and that weights all the concepts of this expanded graph. Based on these weights, we define a measure that solely relies on the semantics of the concept definitions (i.e., that can work on ontologies devoid of instances) and that is able to respect the set of behaviors one can expect from a "good" semantic similarity measure. The measure is finally assessed through different data sets and compared with existing approaches to emphazise the benefits of considering the transitivity and hierarchical organization of roles as well as nominals when computing semantic similarity measurements in SHOQ-based ontologies.

Preliminaries

Background

As usual, for C and D (possibly complex) concepts, $C \sqsubseteq D$ is called a General Concept Inclusion (GCI). A finite set of GCI forms the terminology T (or TBox) of the ontology. A role inclusion axiom is of the form $R \sqsubseteq S$, where R and S are two roles defined in the ontology. The set of all roles in an ontology is named $N_R$ while we denote the set of all transitive roles with $N_{R+}$. The finite set of role inclusion axioms represents a role hierarchy named R. Note that the terms "property" and "role" are considered as equivalent throughout the disclosure.

In the case of ontologies underlied by the DL SHOQ, the pair (T,R) is called a knowledge base (KB) associated with the type of ontology to be processed. The ABox is not included in the definition of the KB.

The formal semantics of SHOQ is defined with respect to an interpretation $I=(\Delta^I, \cdot^I)$. I consists of (i) a non-empty set $\Delta^I$ called the domain of interpretation and (ii) an interpretation function $\cdot^I$ mapping each concept C to a set of individuals $C^I$ (such that $C^I \subseteq \Delta^I$) and each role R to a set of pairs of individuals $R^I$ (such that $R^I \subseteq \Delta^I \times \Delta^I$).

Figure 1:
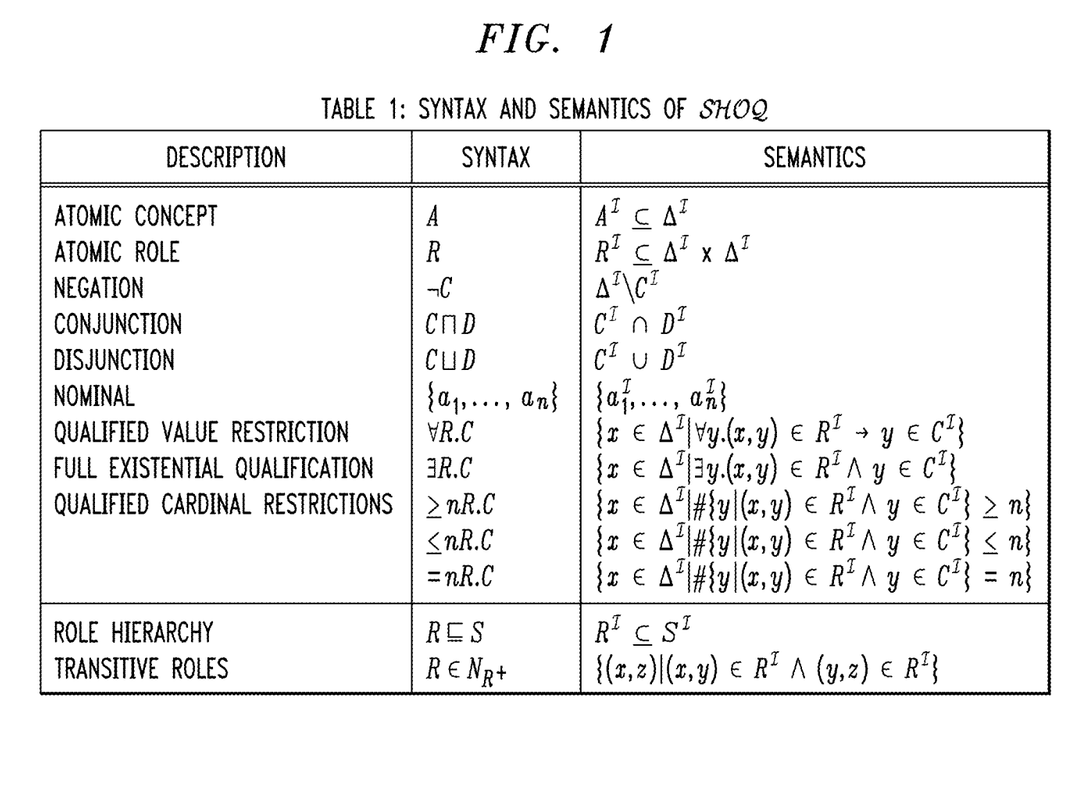
FIG. 1 shows Table 1, which summarizes the semantics of the SHOQ description logic.

With respect to I, the DL SHOQ allows the creation of atomic concepts (A such that $A^I \subseteq \Delta^I$) and atomic roles (R such that $R^I \subseteq \Delta^I \times \Delta^I$). Complex concepts can be written using the operators disjunction, conjunction, full existential qualification, qualified value restriction, qualified cardinal restriction, and negation. Concepts can also be nominals, i.e., defined as an enumeration of instances. Finally, roles can be organized hierarchically and can also be transitive. Table 1 (FIG. 1) summarizes the semantics of the DL SHOQ. In this table, x, y, z, $\alpha_1 \ldots \alpha_n$ denote individuals of $\Delta^I$. n is a positive integer, while the symbol # denotes the cardinality of a set. Note that, throughout the disclosure, the symbol ⊤ denotes the absolute truth (as well as the top concept of the ontology) and ⊥ denotes the absurdity (as well as the bottom concept of an ontology).

The least common subsumer (LCS) of two concepts C and D is defined as the least common concept that subsumes both C and D. In such definition, the LCS results from a computation procedure and may lead to generating a new concept (potentially added in the ontology). The least common ancestor (LCA) denotes the most-specific named concept that subsumes two concepts. Unlike the LCS, the LCA is obtained by solely using the subsumption graph of the ontology and never leads to the generation of a new concept.

Considering a set of axioms forming the terminology T of an ontology O, the term "primitive concepts" denotes the set of concepts of T that occur only on the right-hand side of axioms. If concepts appear in the left-hand side of an axiom, then the term "defined concepts" is used. As an example, in the following axiom $C \equiv R.A \sqcap B, C$ is a defined concept, while A and B are primitive concepts (and R, a role).

Notations and Definitions

For a given ontology O, we use the notation $W_O$ to define the set of all possible SHOQ expressions that can be written by coupling the defined concepts and properties of O with the different SHOQ operators. As a consequence, $T \subseteq W_O$. The term "pseudo-concepts" is used to denote the set of concepts that do not exist in the ontology but that are extracted by the present algorithm (i.e., these concepts have not been defined by an ontologist). The set of pseudo-concepts is written PS and contains expressions formed by concepts and logical operators of the DL SHOQ. As a consequence, $PS \subseteq W_O$.

$G_O$ refers to the classification graph of O before it has been expanded by the present algorithm, while $E_O$ accounts for the expanded classification graph. $G_O$ contains concepts of T, while $E_O$ contains concepts of T∪PS.

In order to elicit the semantics of concepts in T, the concepts are normalized. Towards this goal, a SHOQ Normal Form is defined as follows. (Note that, as defined herein, the SHOQ Normal Form involves neither hierarchy nor transitivity of roles and consequently could be seen as an ALCOQ Normal Form.)

Definition 1. A defined concept $C_D$ is in SHOQ Normal Form iff $C_D \equiv \bot$ then $C_D := \bot$ or if $C_D \equiv T$ then $C_D := T$ or if $C_D \equiv D_1 \sqcup \ldots \sqcup D_n (\forall i=1 \ldots n, D_i \neq \bot)$ then each $D_i$ is such that:

$$D_i := (Prim(D_i)) \cap (Nom(D_i)) \cap \left( \bigcap_{R \in N_R} Rest(R, D_i) \right)$$

with:
- Prim(C), the intersection of all (possibly negated) primitive concepts at the top-level of C,
- Nom(C), the intersection of all (possibly negated) nominals at the top-level of C,
- Rest(R,C)≡Exist(R,C)⊓ Univ(R,C)⊓ Atleast(R,C) ⊓ Atmost(R,C)⊓ Exactly(R,C) with:

$$Exist(R, C) \equiv \bigcap_{C' \in ex(R,C)} \exists R \cdot C',$$

with ex(R,C) being the set of all C' such that ∃R.C' appears at the top level of C (C' is a singleton in the case of ∃R.α restrictions, with α being an individual).

$$Univ(R,C) \equiv \forall R.val(R,C),$$

with val(R,C) being the conjunction $C_i \sqcap \ldots \sqcap C_n$ in the value restriction of role R (here again, $C_i$ is a singleton in the case of ∇R.α restrictions, with α being an individual).

$$Atleast(R, C) \equiv \bigcap_{C' \in al(R,C)} \geq n_{max} R \cdot C',$$

with al(R,C) being the set of all C' such that ≥nR.C' appears at the top level of C and with $n_{max}$ being the highest n if more than one minimal cardinality exists for the same C'.

$$Atmost(R, C) \equiv \bigcap_{C' \in am(R,C)} \leq n_{min} \exists R \cdot C',$$

with am(R,C) being the set of all C' such that ≤nR.C' appears at the top level of C and with $n_{min}$ being the smallest n if more than one maximal cardinality exists for the same C'.

$$Exactly(R, C) \equiv \bigcap_{C' \in exact(R,C)} = R \cdot C',$$

with exact(R,C) being the set of all C' such that =R.C' appears at the top level of C.

Any sub-description C' in ex(R,C), al(R,C), am(R,C), or exact(R,C) and any $C_i \in val(R,C)$ is in Normal Form except if such C' has already been rewritten (allow handling cyclic definitions of concepts such that C≡(∃R.C)).

Note that computing the SHOQ Normal Form of a concept requires writing it in Disjunctive Normal Form (DNF). Such operation is always possible by pushing negation inwards, using De Morgan laws and the duality between existential and universal (¬∃A⇔∇¬A) as well as between atmost and atleast numbers restrictions.

As a convention, the set of direct subsumers of any concept C∈$E_O$ will be written $\overline{S_D}(C)$, while its set of direct subsumees will be written $\underline{S_D}(C)$.

In the current state of the art, although a lot of semantic similarity measures have been designed, none of them takes into account the peculiarities of the SHOQ logic where concepts can, for example, be defined using a hierarchy of (possibly transitive) properties. Moreover, in the SHOQ description logic, concepts can be defined using "nominals," another specificity that has not been taken into account in the state of the art.

The following acronyms or definitions are used in this disclosure:
- DL: Description logic.
- ALE: A particular description logic comprising a set of logical operators.
- ALC: Another description logic containing logical operators that are not in ALE.
- SHI: Yet another description logic containing logical operators that are not in ALE or ALC.
- LCS: Least common subsumer. The LCS of two concepts C and D is defined as the least common concept that subsumes both C and D. In such definition, the LCS results from a computation procedure and may lead to generating a new concept (potentially added in the ontology).
- LCA: Least common ancestor. The LCA denotes the most-specific named concept that subsumes two concepts. Unlike the LCS, the LCA is obtained solely by using the subsumption graph of the ontology and never leads to the generation of a new concept.
- The "root" concept of an ontology refers to the concept that subsumes all others.
- GCS: Good common subsumer of two concepts.
- RCS: Relevant common subsumer of two concepts.
- IC: Information content function.

Many different semantic similarity measures using the topology of an ontology have already been developed. These approaches can be classified as being based on two different types of semantic similarity measures: extentional measures and intentional measures. Extentional similarity measures use extensions of the concepts that they compare (i.e., their instances) to determine a similarity value, while intentional similarity measures focus on the structure of the concept definitions in order to evaluate their similarity. Both types of measures have limitations when used in the context of SHOQ-based ontologies.

The present disclosure defines a new semantic similarity measure that relies on an algorithm that (i) expands the classification graph of any ontology underlied by the SHOQ description logic and (ii) weights the nodes of such graph. Based on a SHOQ normal form (explained below) and a family of generative functions, the algorithm uses various subsumption properties (also explained below) taking into account the specifics of the SHOQ DL to generate a set PS of pseudo-concepts allowing a semantic Web engine to determine additional inferences when reclassifying the ontology.

Although useless from the domain definition point of view, these pseudo-concepts are useful when computing semantic similarity by making explicit the underlied semantics implied by the concepts originally defined. All the concepts (including the pseudo-concepts) of the expanded graph are further weighted using their outdegree as well as the weight of their children (0 if the node is a leaf). In a graph made of nodes and node-connecting edges, the outdegree of a node is the number of outgoing edges at that node. These weights are further used when computing the semantic similarity of any two concepts, in the case of such concepts having dissimilar fragments of semantics in their descriptions.

Figure 2:
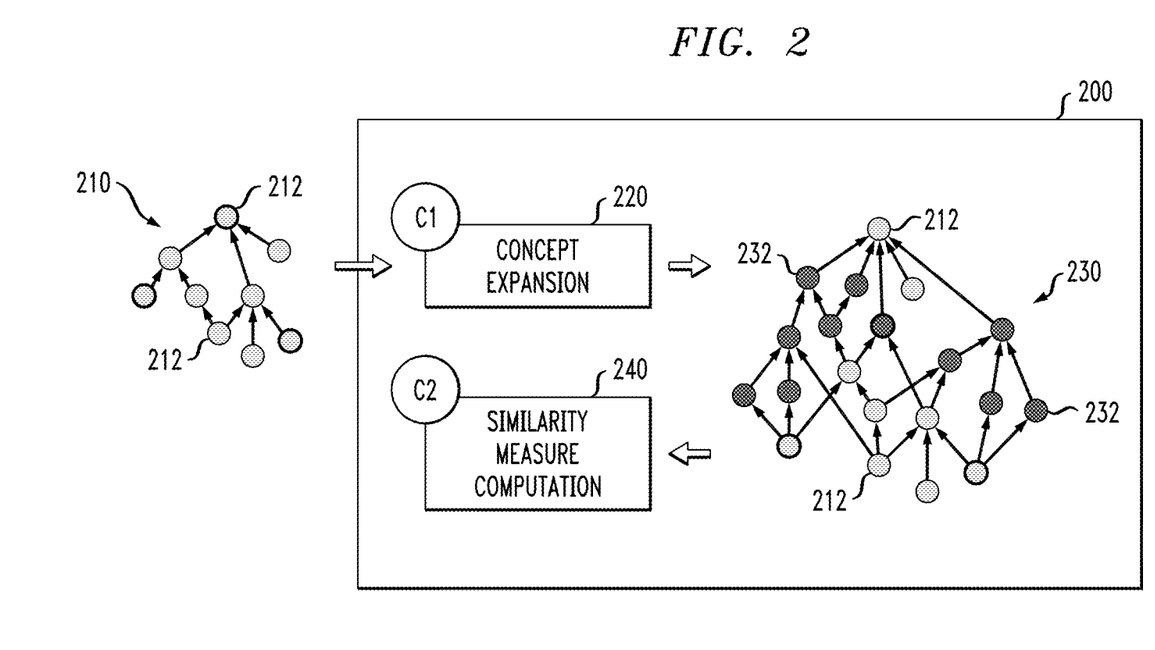
FIG. 2 graphically represents an algorithm for computing the semantic similarity between different concepts having been defined in an ontology underlied by the SHOQ description logic, according to one embodiment of the disclosure.

FIG. 2 graphically represents an algorithm for computing the semantic similarity between different concepts having been defined in an ontology underlied by the SHOQ description logic, according to one embodiment of the disclosure. As shown in FIG. 2, an original ontology 210 containing a number of inter-related complex concepts 212 is input to system 200, which performs concept expansion 220 that generates an expanded ontology 230 containing the original complex concepts 212 plus a number of pseudo-concepts 232. Concept expansion 220 generates pseudo-concepts based on the specificities of the SHOQ description logic, for example, where ontological concepts can be defined using hierarchically (potentially) transitive roles.

Figure 3:
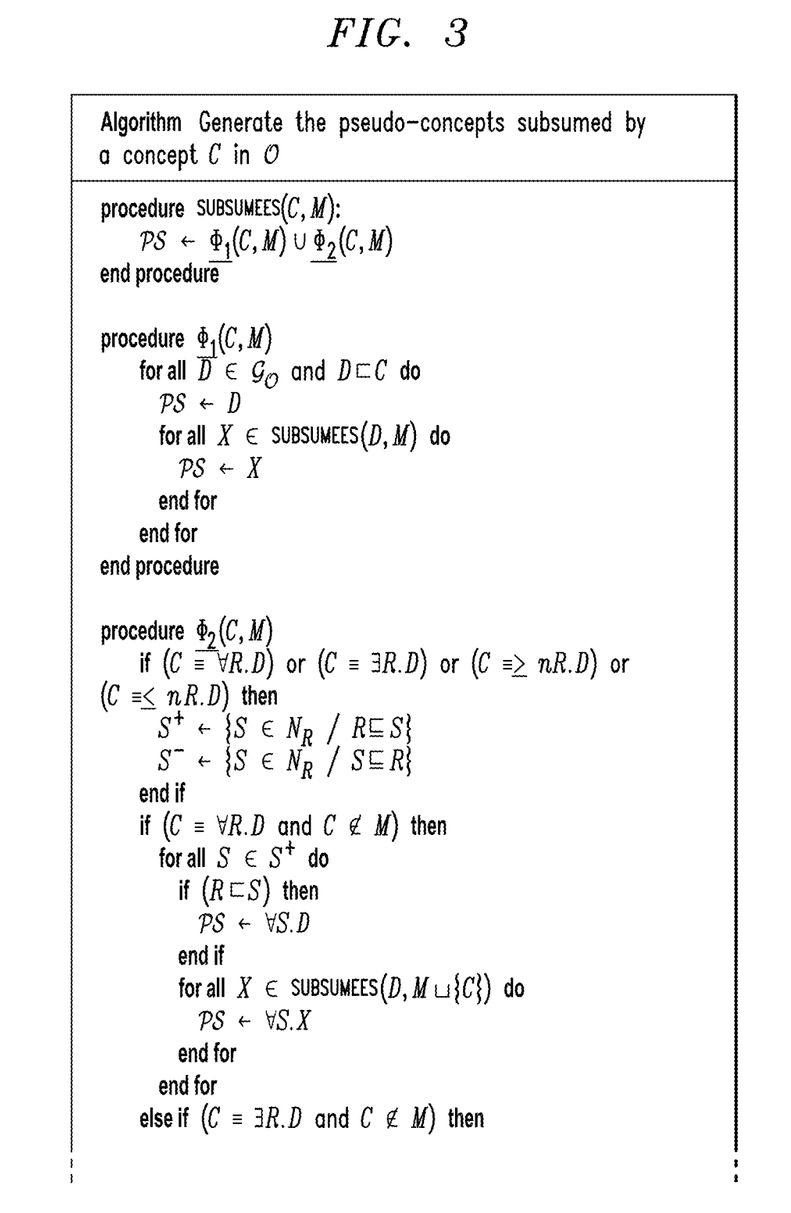
FIG. 3 shows pseudo-code for a procedure that generates pseudo-concepts that are subsumed by a concept C in an ontology O, while FIG. 4. shows pseudo-code for a procedure that generates pseudo-concepts that subsume a concept C in ontology O.
Figure 4:
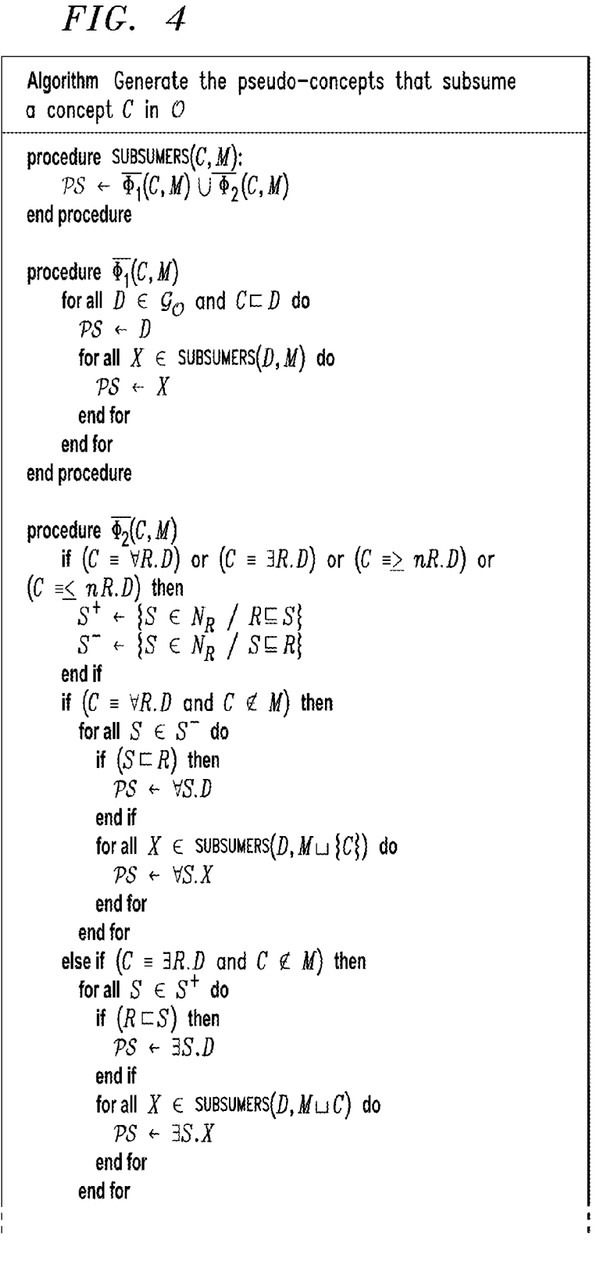

FIG. 3 shows pseudo-code for a procedure that generates pseudo-concepts that are subsumed by a concept C in an ontology O, while FIG. 4. shows pseudo-code for a procedure that generates pseudo-concepts that subsume a concept C in ontology O. Note that the pseudo-code of FIG. 3 calls the procedure "SUBSUMERS," which is defined in FIG. 4, while the pseudo-code in FIG. 4 calls the procedure "SUBSUMEES," which is defined in FIG. 3.

After generating the pseudo-concepts 232, the system 200 applies similarity measure computation 240 to the resulting expanded ontology 230 to generate one or more measures of the semantic similarity between different pairs of concepts. For a given pair of concepts in the expanded ontology 230 (e.g., two original concepts, two pseudo-concepts, or one original concept and one pseudo-concept), similarity measure computation 240 generates a single measure characterizing the semantic similarity between the two concepts. The semantic similarity measure is based on the common and dissimilar semantics in the concept descriptions for each pair of compared concepts. Note that, although it is possible to generate a semantic similarity measure for any given pair of concepts in the expanded ontology 230, the interest is on generating semantic similarity measurements for any pair of concepts in the original ontology 210.

Concept-Expansion Mechanism

Figure 5:
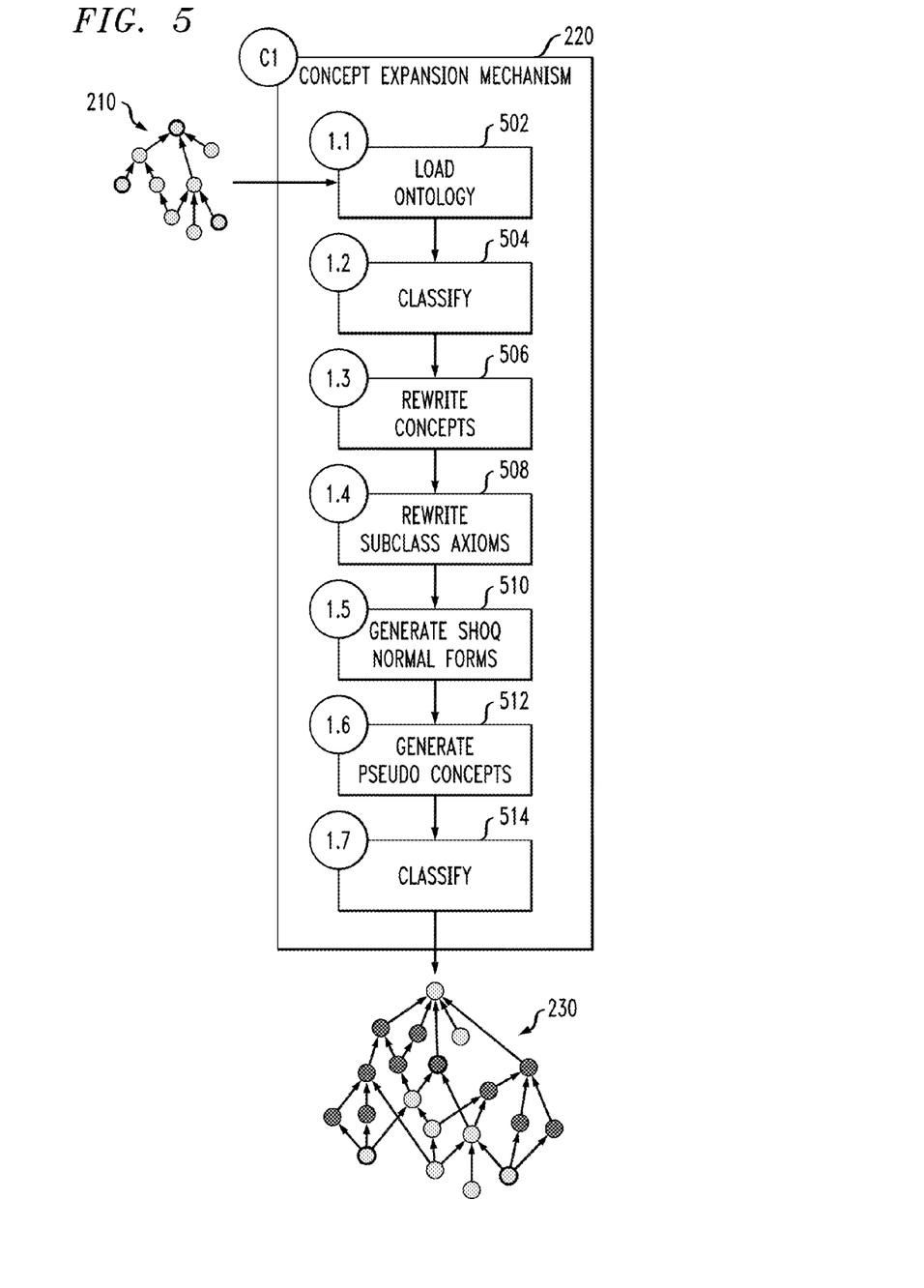
FIG. 5 shows a flow diagram of the concept-expansion mechanism of FIG. 2.

FIG. 5 shows a flow diagram of the concept-expansion mechanism 220 of FIG. 2. As shown in FIG. 5, in step 502, the original ontology 210 is loaded into the system 200 of FIG. 2 that performs similarity computation. This step creates a knowledge base that a semantic engine can analyze to perform inference tasks. As such, this step can be implemented using a suitable standard API, such as the OWL API available at http://owlapi.sourceforge.net/.

In step 504, the system 200 classifies the original concepts by computing inferences using the original ontology. This step can be performed using tools found in the state of the art, such as Fact++ available at http://owl.man.ac.uk/factplusplus/, Hermit available at http://hermit-reasoner.com/, or Pellet available at http://clarkparsia.com/pellet/.

In step 506, whenever possible, the system rewrites a concept definition (e.g., C) by replacing any defined concept (e.g., A) appearing on the right-hand side of the concept definition by its expression (e.g., $\begin{cases} A = B \cap D \\ C = \exists R \cdot A \end{cases} \Rightarrow C = \exists R \cdot (B \cap D))$.

This rewriting step enables the system 200 to detect cyclic definitions (e.g., a concept C defined such as: C=∃R.C) and to compute SHOQ normal forms.

In step 508, the system 200 rewrites sub-class axioms by replacing all defined concepts appearing in subsumption axioms (e.g., C⊑D) by their expression computed in step 506. A consequence of this rewriting is that any subsumption axiom may become a General Concept Inclusion (GCI). For example, an axiom such as C⊑D may be rewritten as the GCI (A∩B)⊑(E∩F).

In step 510, the system 200 rewrites each concept in the original ontology (that is not already written in its SHOQ normal form) into its SHOQ normal form, extending the concept of ALC normal form used in C. d'Amato, N. Fanizzi, and F. Esposito, "A dissimilarity measure for ALC concept descriptions," *Proceedings of the 2006 ACM Symposium on Applied Computing*, pages 1695-1699, ACM, New York, 2006, the teachings of which are incorporated herein by reference in their entirety. This step enables the system 200 to elicit the semantics of concepts.

Step 510 consists of rewriting concepts in disjunctive normal form. Each disjunct of this form is in conjunctive normal form (CNF). The conjuncts composing the CNF are gathered according to their types, such as primitives (i.e., concepts that are not complex), nominals (i.e., concepts defined by a set of one or more instances), universal restrictions (i.e., conjuncts expressed with qualified values), existential restrictions (i.e., conjuncts expressed with full existential qualification), minimal cardinality restrictions (i.e., conjuncts expressed with qualified minimal cardinality), maximal cardinality restrictions (i.e., conjuncts expressed with qualified maximal cardinality), and exact cardinality restrictions (i.e., conjuncts expressed with qualified exact cardinality). Note that this formula for rewriting concepts in disjunctive normal form relies on logical operators found only in ALCOQ (a sub-logic of SHOQ).

In step 512, the system 200 generates zero, one, or more pseudo-concepts for each original concept defined in the original ontology and having been rewritten in SHOQ normal form. This step takes into account the specific case of existential restrictions with a transitive property on a domain defined through nominals.

For each original concept found in the ontology being studied, a set of pseudo-concepts can be generated using a family of generative functions. In particular, these functions analyze each conjunct of each disjunct of the SHOQ normal form of each original concept. For a given conjunct, the generative functions make use of subsumption relations that can be found with operators of the DL SHOQ (see Appendix). The generative functions try to apply the subsumption relations to each conjunct that is expressed as a set of restrictions. In particular, the generative functions make use of subsumption relations involving qualified value restrictions (P.2 of Appendix), full existential qualification (P.4), and qualified cardinal restrictions (P.6 and P.8). Additionally, the generative functions also derive pseudo-concepts based on the subsumption properties that can be determined when conjuncts are expressed with properties having either superor sub-properties (P.1 if such properties are applied in a universal qualification, P.3 in the case of an existential qualification, P.5 in the case of minimal cardinality, and P.7 in the case of maximal cardinality). Finally, the generative functions can determine additional subsumption relations when concepts are expressed with transitive properties (P.9).

After the pseudo-concepts have been generated in step 512, in step 514, the system 200 updates the knowledge base by performing a classification task (e.g., similar to step 504) for the resulting expanded ontology 230.

Similarity Measure Computation

As described previously, following concept expansion 220 of FIGS. 2 and 5, the system 200 performs similarity measure computation 240 on the resulting expanded ontology 230. In order to describe this function, the following notations are introduced:

Go refers to the original classification graph (i.e., the graph without any pseudo-concepts, such as the classification graph for the original ontology 210 of FIGS. 2 and 5).

Eo refers to the expanded classification graph (i.e., the graph with all pseudo-concepts, such as the classification graph for the expanded ontology 230 of FIGS. 2 and 5).

Based on Eo, a semantic similarity measure can be proposed for any two concepts of Go. In one embodiment, this measure focuses on evaluating both the common and the different semantics that these two concepts share. Towards this goal, and for any two concepts in Go, their common semantics are based on the number of semantically equivalent pseudo-concepts that they share in their descriptions. A relevant common subsumer (RCS) in Eo subsuming (at least) the union of the dissimilar semantics of these two concepts can also be determined.

Computing the RCS of the dissimilar semantics of any two concepts is explained hereafter. Since this method is computationally expensive, it might be applied only for relatively small ontologies. For large ontologies, the RCS may be represented simply by the union of the dissimilar semantics of the two concepts.

The following presents the concepts and definitions that underlie the determination of the RCS, which, in some embodiments, is a pre-requisite in order to get semantic similarity measurements.

First, a concept weight $\omega$ is associated with each concept C of Eo. In some embodiments, the concept weight $\omega$ can be given by the following formula:

$$\omega(C) = \frac{\sum_{\alpha \in S_D(C)} \omega(\alpha) + 1}{|S_D(C)|},$$

where:

$S_D(C)$ refers to the set of direct subsumees of concept C in Eo; and $|S_D(C)|$ refers to the set of direct subsumees of concept C in Eo.

Figure 6:
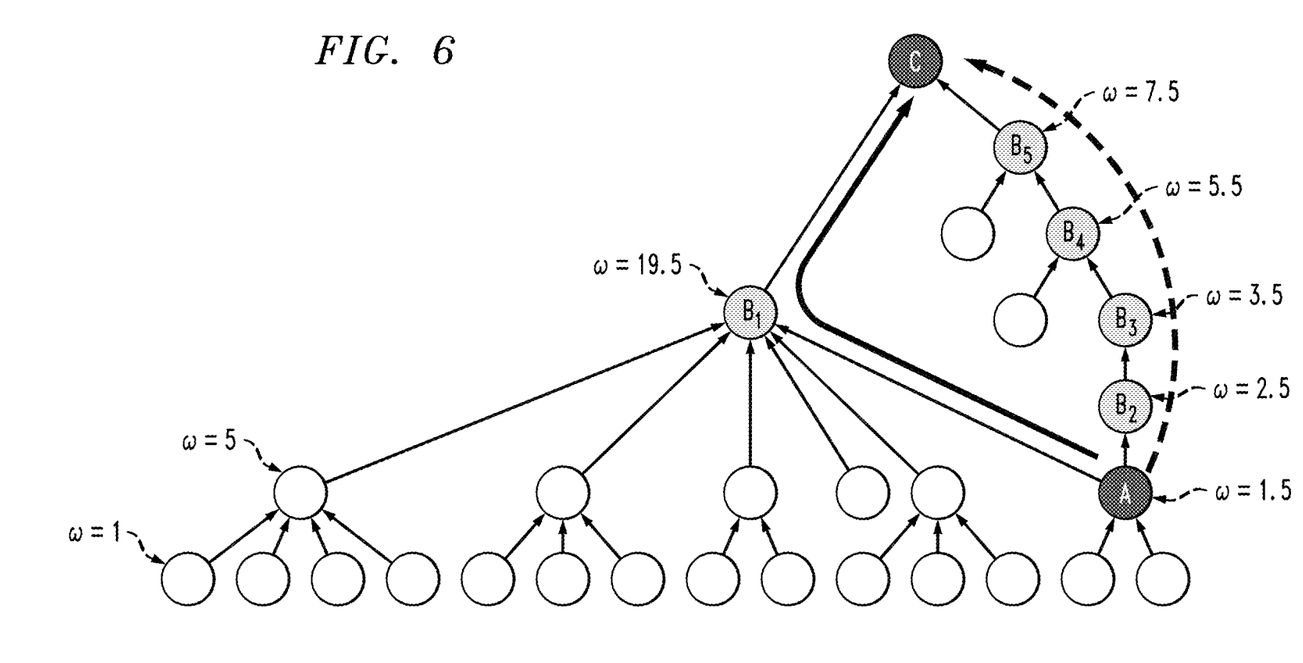
FIG. 6 shows an example of two "branches" linking concepts A and C in an exemplary graph Eo.

Along with the concept weight $\omega$, a branch weight $\Omega$ is associated with each branch that links two concepts in Eo. In general, any two concepts in Eo may be linked by one or more branches due to the one or more subsumers that any given concept may have in Eo. FIG. 6 shows an example of two "branches" linking concepts A and C in an exemplary graph Eo: one branch involving concept $B_1$ and the other branch involving concepts $B_2$-$B_5$. In some embodiments, for two concepts E and F, the branch weight $\Omega$ can be given as the sum of the concept weights $\omega$ of the concepts in the branch (including the concepts E and F) by the following formula:

$$\Omega(B(E \to F)) = \sum_{C_i \in B(E \to F)} \omega(C_i),$$

where:

$B(E \to F)$ refers to a branch between concepts E and F in Eo; and $C_i$ is a concept in that branch.

Note that concepts $C_i$ are represented in FIG. 6 by labels A, C, $B_1$, $B_2$, $B_3$, etc.

Based on one or more different branch weights $\Omega$ having been computed (i.e., one weight $\Omega$ per branch, where there can be multiple branches resulting from the fact that nodes may have multiple subsumers, as in the example of FIG. 6), the RCS of two concepts E, F is the direct subsumer (or one of the direct subsumers taken arbitrarily) of E∪F minimizing the sum of the weights of the two branches $B(E \to C)$ and $B(F \to C)$. Formally, $$C_0 \in \arg\min \psi(C),$$

where function $\psi$ is defined as follows:

$$\Psi: \overline{S_D}(E \underset{C}{\sqcup} F) \to R$$

$$\to \min_{\mathcal{B}_i \in \overline{\mathfrak{B}}(E \to C)} (\Omega(\mathcal{B}_i(E \to C))) + \min_{\mathcal{B}_i \in \overline{\mathfrak{B}}(F \to C)} (\Omega(\mathcal{B}_i(F \to C))).$$

In other words, determining the RCS of concepts E and F accounts for finding the most-appropriate direct subsumer (DS) amongst the set of direct subsumers (DSi) of the union of the semantics of E and F (E∪F). To achieve this, the following procedure is performed.

For each direct subsumer DSi, two set of weights (S1(DSi) and S2(DSi)) are computed. S1(DSi) refers to all weights $\Omega$ being computed between concepts E and DSi (recall that there is one weight $\Omega$ per branch, while there can be several branches between two concepts). S2(DSi) refers to all weights $\Omega$ being computed between concepts F and DSi. The application of function $\psi$ on DSi returns the sum of the lowest number in S1(DSi) and the lowest number in S2(DSi). For N direct subsumers of the union of the semantics of concepts E and F (N DSi), N numbers are provided by the application of function $\psi$, leading to a set S3. The RCS of concepts E and F is the one having generated the lowest number by function $\psi$ (provided by the arg min function). If several DSi lead to the same value, then one of them is arbitrarily chosen.

With all these definitions, the semantic similarity sim of any two concepts A, B can be computed according to the following formula:

$$sim(A, B) = \frac{2 \times n_c(A, B)}{n_t(A, B)} + \left[\left(1 - \frac{2 \times n_c(A, B)}{n_t(A, B)}\right) \times \left(\frac{2 \times IC(RCS(\delta(A, B), \delta(B, A)))}{IC(\delta(A, B)) + IC(\delta(B, A))}\right)\right];$$

where:

$n_c(A,B)$ refers to the number of semantically equivalent concepts in $\overline{S_D}(A)$ and $\overline{S_D}(B)$;

$n_t(A,B)$ refers to the number of direct subsumers of concepts A and B and is equal to $|\overline{S_D}(A) + \overline{S_D}(B)|$; and IC is the information content function.

In some embodiments, the information content function IC is defined by the following formula:

$$IC(A) = -\log\left(\frac{1 + n_s(A)}{1 + n_s(\text{Top})}\right),$$

where:

Top refers to the root concept in the ontology where concept A is defined; and $n_S(A)$ is the total number of subsumers of concept A in the expanded graph Eo.

Finally, the semantic function $\delta(A,B)$ is used in order to evaluate the different semantics of two concepts and, in some embodiments, is defined as follows:

$$\delta: \mathcal{G}_O \times \mathcal{G}_O \rightarrow \mathcal{W}_O$$

$$(A, B) \rightarrow \begin{cases} \sqcap_i C_i \text{ such that } C_i \in \overline{S_D}(A) \sqcap \neg \overline{S_D}(B) \\ A \text{ if } \forall\, C_i \in \overline{S_D}(A), C_i \in \overline{S_D}(B) \end{cases}$$

The semantic function $\delta(A,B)$) returns the piece of semantics that is covered by the definition of A and not by the definition of B. Note that, if the definition of A is included in B, then $\delta$ returns A.

The similarity formula sim(A,B) given above computes the similarity of two ontological concepts A and B by relying on two intermediate similarity results (i.e., the two expressions summed in the formula). The first one results from the analysis of the common semantics found in both concepts, while the second one accounts for quantifying the partial similarity of the dissimilar semantics found in both concepts.

In particular, both intermediate results take into account the number $n_t(A,B)$ of direct subsumers of both concepts. In addition, the second intermediate result takes into account the relevant common subsumer (e.g., RCS($\delta(A,B),\delta(B,A)$)) of the dissimilar semantics of both concepts. Note that alternative versions of the similarity formula may utilize the least common subsumer, the good common subsumer, or any other suitable definition of a subsumer, instead of the relevant common subsumer.

Furthermore, the second intermediate result relies on a quantification of the information content (IC) conveyed by a concept, where the IC is quantified as a negative log likelihood (e.g., IC=−log X). While the IC function IC(A) given above relies on a particular expression of X, other suitable expressions may be used in alternative versions of this function. See, e.g., P. Resnik, "Using information content to evaluate semantic similarity in a taxonomy," IJCAI, pages 448-453, Morgan Kaufmann, 1995, the teachings of which are incorporated herein by reference in their entirety.

Figure 7:
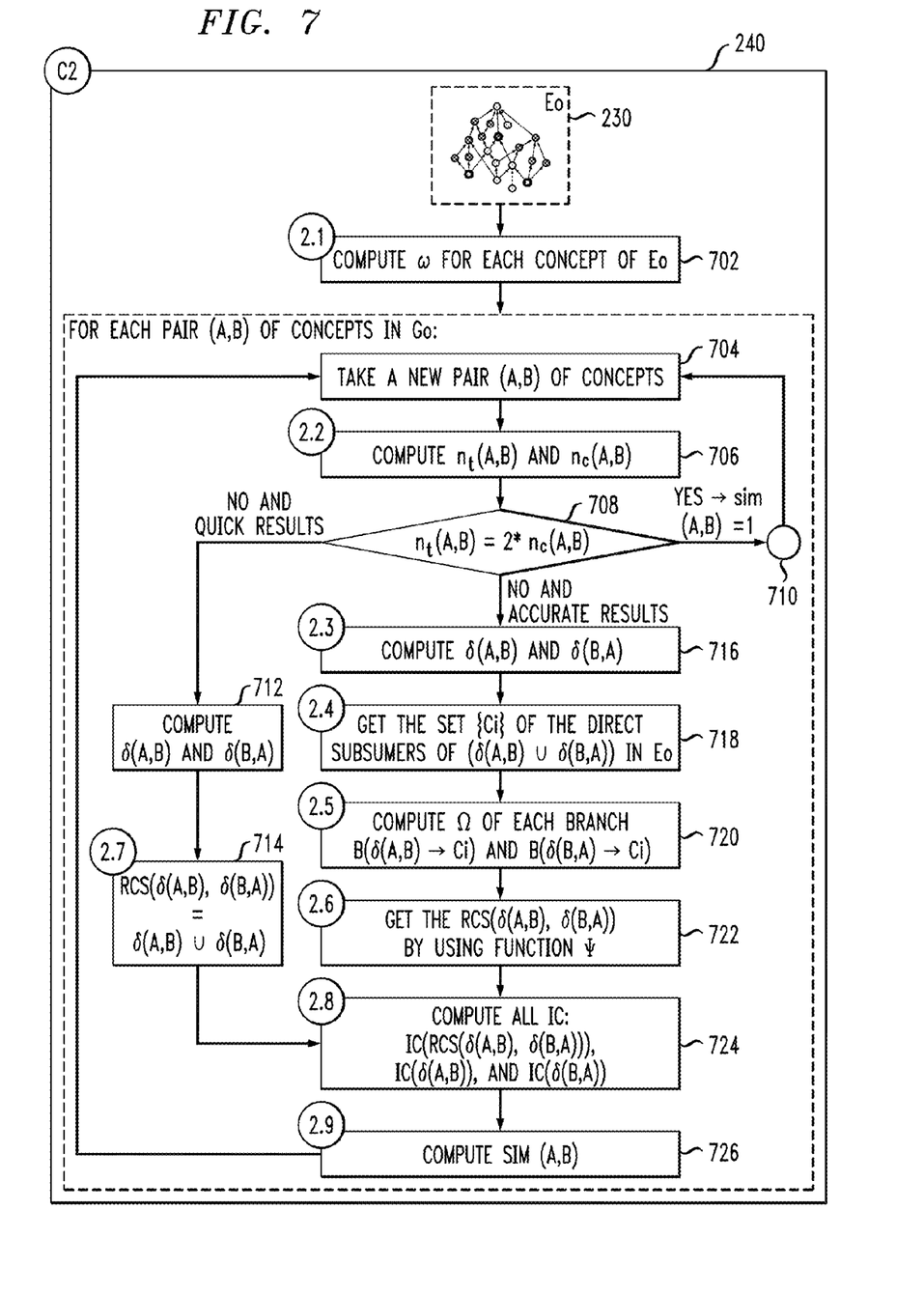
FIG. 7 shows a flow diagram of the similarity measure computation of FIG. 2, according to certain embodiments of the disclosure.

FIG. 7 shows a flow diagram of similarity measure computation 240 of FIG. 2, according to certain embodiments of the disclosure. In particular, FIG. 7 shows the process of system 200 of FIG. 2 computing a similarity measure between one or more different pairs of concepts in exemplary expanded ontology 230 of FIG. 2. In the flow diagram of FIG. 7, each pair of concepts is generically labeled A and B. The steps in FIG. 7 are based on the math presented above.

In step 702, the system 200 computes the weight ω for each concept (including each pseudo-concept) in the expanded graph Eo.

In step 704, the system 200 selects a (next) pair of concepts A and B.

In step 706, the system 200 computes (i) the number $n_c(A,B)$ of semantically equivalent concepts in the direct subsumer sets $\overline{S_D}(A)$ and $\overline{S_D}(B)$ and (ii) the number $n_t(A,B)$ of direct subsumers of concepts A and B.

In step 708, the system 200 determines whether or not the number $n_t(A,B)$ of direct subsumers of concepts A and B is twice as big as the number $n_c(A,B)$ of semantically equivalent concepts in the direct subsumer sets $\overline{S_D}(A)$ and $\overline{S_D}(B)$. If so, then the similarity measure between the concepts A and B is set to 1 (step 710), and, if the similarity measure between another pair of concepts is to be computed, then processing returns to step 704. Although the processing of step 708 is based on a factor of 2 between $n_t(A,B)$ and $n_c(A,B)$, other factors can be used in other implementations.

If the comparison of step 708 is not true, then processing continues to step 712 if the user wants (possibly less-accurate) results sooner or to step 716 if the user wants more-accurate results. If the user indicates that results need to be obtained as quickly as possible, then the system 200 generates the semantic functions $\delta(A,B)$ and $\delta(B,A)$ in step 712, and, in step 714, the system 200 sets the relevant common subsumer (RCS) for concepts A and B equal to the union of the semantic functions $\delta(A,B)$ and $\delta(B,A)$. Processing then continues to step 724, which will be explained below.

If, instead, the user indicates that more-accurate results are needed, then processing proceeds to step 716, where the system 200 generates the semantic functions $\delta(A,B)$ and $\delta(B,A)$.

In step 718, the system 200 determines the set {Ci} of direct subsumers of the union of $\delta(A,B)$ and $\delta(B,A)$ in the expanded graph Eo.

In step 720, the system 200 computes the weight ω of each branch B($\delta(A,B) \rightarrow C_i$) and each branch B($\delta(B,A) \rightarrow C_i$).

In step 722, the system 200 generates the RCS for concepts A and B using the function ψ.

In step 724, the system 200 computes the information content functions IC for the RCS of step 714 or step 722 and for the individual semantic functions $\delta(A,B)$ and $\delta(B, A)$ of step 712 or 716.

In step 726, the system 200 computes the semantic similarity measure sim for the concepts A and B. If the similarity measure between another pair of concepts is to be computed, then processing returns to step 704.

APPENDIX—SUBSUMPTION RELATIONS IN SHOQ

The following presents the different subsumption relations that ground the definition of the generative function family $F_G$. These properties involve the role hierarchy $\mathcal{R}$ of a knowledge base as well as the logical operators of the DL SHOQ given previously.

For a given role R∈$\mathcal{R}$, S$^+$ denotes any of its superproperties and S$^-$ denotes any of its subproperties. With these conventions, the following subsumption properties exist:

Subsumption Properties on Universal Restrictions:

P.1: $\forall S^+.X \sqsubseteq \forall R.X \sqsubseteq \forall S^-.X$.

P.2: $X \sqsubseteq Y \rightarrow \forall R.X \sqsubseteq \forall R.Y$

Subsumption Properties on Existential Restrictions:

P.3: $\exists S^-.X \sqsubseteq \exists R.X \sqsubseteq \exists S^+.X$

P.4: $X \sqsubseteq Y \rightarrow \exists R.X \sqsubseteq \exists R.Y$

Subsumption Properties on Cardinal Restrictions:

P.5: $\geq nS^-.X \sqsubseteq \geq nR.X \sqsubseteq \geq nS^+.X$

P.6: $X \sqsubseteq Y \rightarrow \geq nR.X \sqsubseteq \geq nR.Y$

P.7: $\leq nS+.X \sqsubseteq \leq nR.X \sqsubseteq \leq nS^-.X$

P.8: $X \sqsubseteq Y \leq nR.Y \leq nR.X$

Subsumption Properties on Existential Restrictions Involving a Transitive Property and Nominals:

P.9: $R \in N_{R^+} \wedge C \equiv \exists R.\{a_0, \ldots, a_n\} \wedge \forall \epsilon \in \{a_0, \ldots a_n\}$, $\exists \eta \in D \equiv \{b_0, \ldots b_p\}$ such that it holds $R(\epsilon, \eta) \vdash \exists R.\{a_n, \ldots, a_n\} \sqsubseteq \exists R.\{b_O, \ldots, b_p\}$ Although the disclosure has been described in the context of a process that computes a similarity measure after performing concept expansion on an original ontology, there may be other contexts in which concept expansion may be applied.

Although the disclosure has been described in the context of SHOQ ontologies, other contexts involving other ontologies are also possible, such as other ontologies having concepts defined using a hierarchy of (possibly transitive) properties.

Furthermore, the semantic similarity function sim(A,B) can be applied to other ontologies, including those that do not have concepts defined using a hierarchy of properties.

Embodiments of the invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

Embodiments of the invention can be manifest in the form of methods and apparatuses for practicing those methods. Embodiments of the invention can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Embodiments of the invention can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

It will be further understood that various changes in the details, materials, and arrangements of the parts which have been described and illustrated in order to explain embodiments of this invention may be made by those skilled in the art without departing from embodiments of the invention encompassed by the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A machine-implemented method comprising:
   (a) the machine receiving an original ontology containing a plurality of original concepts, wherein at least one original concept is defined using a hierarchy of properties;
   (b) the machine applying a concept expansion mechanism to the original ontology to generate an expended ontology containing the original concepts and one or more pseudo-concepts, wherein the concept expansion mechanism comprises:
  (1) the machine classifying the original concepts by computing inferences using the original ontology;
  (2) the machine rewriting at least one original concept definition by replacing at least one defined concept appearing in the original concept definition by its expression;
  (3) the machine rewriting at least one sub-class axiom by replacing at least one defined concept appearing in a subsumption axiom by its expression as rewritten in step (2);
  (4) the machine rewriting at least one original concept in its normal form;
  (5) the machine generating a pseudo-concept of the expanded ontology for the at least one original concept rewritten in its normal form; and
  (6) the machine classifying concepts of the expanded ontology by computing inferences using the expanded ontology; and
(c) the machine applying a similarity measure computation to the expanded ontology to generate a similarity measure characterizing similarity between at least two concepts in the expanded ontology, wherein the similarity measure generated using the expanded ontology provides more accurate characterization of the similarity between the at least two concepts than a corresponding similarity measure generated using the original ontology.

2. The method of claim 1, wherein at least one property in the hierarchy is a transitive property.

3. The method of claim 2, wherein the original ontology is a SHOQ ontology.

4. The method of claim 3, wherein step (4) comprises the machine rewriting the at least one original concept in disjunctive normal form, wherein each disjunct of the disjunctive normal form is in conjunctive normal form.

5. The method of claim 3, wherein step (5) comprises the machine generating the pseudo-concept by applying one or more generative functions to at least one conjunct of at least one disjunct of the at least one original concept rewritten in its SHOQ normal form.

6. The method of claim 5, wherein:
  the at least one original concept rewritten in its SHOQ normal form has at least one transitive property; and
  the one or more generative functions determine at least one additional subsumption relation for the at least one original concept.

7. The method of claim 1, wherein, for two concepts in the expanded ontology, the similarity measure computation comprises:
  (1) generating a first similarity result corresponding to common semantics found in the two concepts;
  (2) generating a second similarity result corresponding to dissimilar semantics found in the two concepts; and
  (3) combining the first and second similarity results to generate the similarity measure.

8. The method of claim 7, wherein:
  the first similarity result is based on a number of direct subsumers of the two concepts; and
  the second similarity result is based on (i) the number of direct subsumers of the two concepts, (ii) a common subsumer of the dissimilar semantics of the two concepts; and (iii) information content conveyed by the two concepts.

9. The method of claim 8, wherein the similarity measure computation for the two concepts A and B is given by:

$$sim(A, B) = \frac{2 \times n_c(A, B)}{n_t(A, B)} + \left[\left(1 - \frac{2 \times n_c(A, B)}{n_t(A, B)}\right) \times \left(\frac{2 \times IC(RCS(\delta(A, B), \delta(B, A)))}{IC(\delta(A, B)) + IC(\delta(B, A))}\right)\right];$$

where:
  $n_c(A, B)$ is a number of semantically equivalent concepts in $\overline{S_D}(A)$ and $\overline{S_D}(B)$;
  $\overline{S_D}(A)$ is a direct subsumer set for concept A;
  $\overline{S_D}(B)$ is a direct subsumer set for concept B;
  $n_t(A, B)$ is the number of direct subsumers of concepts A and B and is equal to $|\overline{S_D}(A)| + |\overline{S_D}(B)|$;
  IC is an information content function;
  RCS is the common subsumer of the dissimilar semantics of the two concepts; and
  $\delta(A, B)$ is a semantic function that characterizes different semantics between the two concepts.

10. The method of claim 9, wherein the information content function IC is given by:

$$IC(A) = -\log\left(\frac{1 + n_s(A)}{1 + n_s(\text{Top})}\right),$$

where:
  Top refers to a root concept in the expanded ontology where concept A is defined; and
  $n_S(A)$ is a total number of subsumers of concept A in the expanded ontology.

11. The method of claim 9, wherein the semantic function $\delta(A, B)$ is given by:

$$\delta: \mathcal{G}_O \times \mathcal{G}_O \rightarrow \mathcal{W}_O$$
$$(A, B) \rightarrow \begin{cases} \sqcap_i C_i \text{ such that } C_i \in \overline{S_D}(A) \sqcap \neg \overline{S_D}(B) \\ A \text{ if } \forall C_i \in \overline{S_D}(A), C_i \in \overline{S_D}(B) \end{cases}.$$

12. A machine-implemented method comprising:
(a) the machine receiving an original ontology containing a plurality of original concepts;
(b) the machine applying a concept expansion mechanism to the original ontology to generate an expanded ontology containing the original concepts and one or more pseudo-concepts; and
(c) the machine applying a similarity measure computation to the expanded ontology to generate a similarity measure characterizing similarity between at least two concepts in the expanded ontology, wherein:
  the similarity measure generated using the expanded ontology provides more accurate characterization of the similarity between the at least two concepts than a corresponding similarity measure generated using the original ontology;
  for two concepts in the expanded ontology, the similarity measure computation comprises:
    (1) the machine generating a first similarity result corresponding to common semantics found in the two concepts;
    (2) the machine generating a second similarity result corresponding to dissimilar semantics found in the two concepts; and (3) the machine combining the first and second similarity results to generate the similarity measure:
the first similarity result is based on a number of direct subsumers of the two concepts; and
the second similarity result is based on (i) the number of direct subsumers of the two concepts, (ii) a common subsumer of the dissimilar semantics of the two concepts; and (iii) information content conveyed by the two concepts.

13. The method of claim 12, wherein the similarity measure computation for the two concepts A and B is given by:

$$sim(A, B) = \frac{2 \times n_c(A, B)}{n_t(A, B)} + \left[\left(1 - \frac{2 \times n_c(A, B)}{n_t(A, B)}\right) \times \left(\frac{2 \times IC(RCS(\delta(A, B), \delta(B, A)))}{IC(\delta(A, B)) + IC(\delta(B, A))}\right)\right],$$

where:
$n_c(A, B)$ is a number of semantically equivalent concepts in $\overline{S_D}(A)$ and $\overline{S_D}(B)$;
$\overline{S_D}(A)$ is a direct subsumer set for concept A;
$\overline{S_D}(B)$ is a direct subsumer set for concept B;
$n_t(A, B)$ is the number of direct subsumers of concepts A and B and is equal to $|\overline{S_D}(A)| + |\overline{S_D}(B)|$;
IC is an information content function;
RCS is the common subsumer of the dissimilar semantics of the two concepts; and
$\delta(A, B)$ is a semantic function that characterizes different semantics between the two concepts.

14. The method of claim 13, wherein the information content function IC is given by:

$$IC(A) = -\log\left(\frac{1 + n_s(A)}{1 + n_s(\text{Top})}\right),$$

where:
Top refers to a root concept in the expanded ontology where concept A is defined; and
$n_S(A)$ is a total number of subsumers of concept A in the expanded ontology.

15. The method of claim 13, wherein the semantic function $\delta(A, B)$ is given by:

$$\delta: \mathcal{G}_O \times \mathcal{G}_O \to \mathcal{W}_O$$
$$(A, B) \to \begin{cases} \sqcap_i C_i \text{ such that } C_i \in \overline{S_D}(A) \sqcap \neg \overline{S_D}(B) \\ A \text{ if } \forall C_i \in \overline{S_D}(A), C_i \in \overline{S_D}(B) \end{cases}.$$

16. A machine comprising:
an input node configured to receive an original ontology containing a plurality of original concepts wherein at least one original concept is defined using a hierarchy of properties;
a concept expansion mechanism configured to apply concept expansion the original ontology to generate an expanded ontology containing the original concepts and one or more pseudo-concepts, wherein the concept expansion mechanism comprises:
(1) the machine classifying the original concepts by computing inferences using the original ontology;
(2) the machine rewriting at least one original concept definition by replacing at least one defined concept appearing in the original concept definition by its expression;
(3) the machine rewriting at least one sub-class axiom by replacing at least one defined concept appearing in a subsumption axiom by its expression as rewritten in step (2);
(4) the machine rewriting at least one original concept in its normal form;
(5) the machine generating a pseudo-concept of the expanded ontology for the at least one original concept rewritten in its normal form; and
(6) the machine classifying concepts of the expanded ontology by computing inferences using the expanded ontology; and
a similarity measure mechanism configured to apply a similarity measure computation to the expanded ontology to generate a similarity measure characterizing similarity between at least two concepts in the expanded ontology, wherein the similarity measure generated using the expanded ontology provides more accurate characterization of the similarity between the at least two concepts than a corresponding similarity measure generated using the original ontology.

17. The machine of claim 16, wherein, for two concepts in the expanded ontology, the similarity measure computation comprises:
(1) generating a first similarity result corresponding to common semantics found in the two concepts;
(2) generating a second similarity result corresponding to dissimilar semantics found in the two concepts; and
(3) combining the first and second similarity results to generate the similarity measure.

18. The machine of claim 16, wherein at least one property in the hierarchy is a transitive property.

19. The machine of claim 18, wherein the original ontology is a SHOQ ontology.

* * * * *